March 1, 1960  E. F. AGNEW  2,926,716
TRACTION DEVICE
Filed Jan. 20, 1958
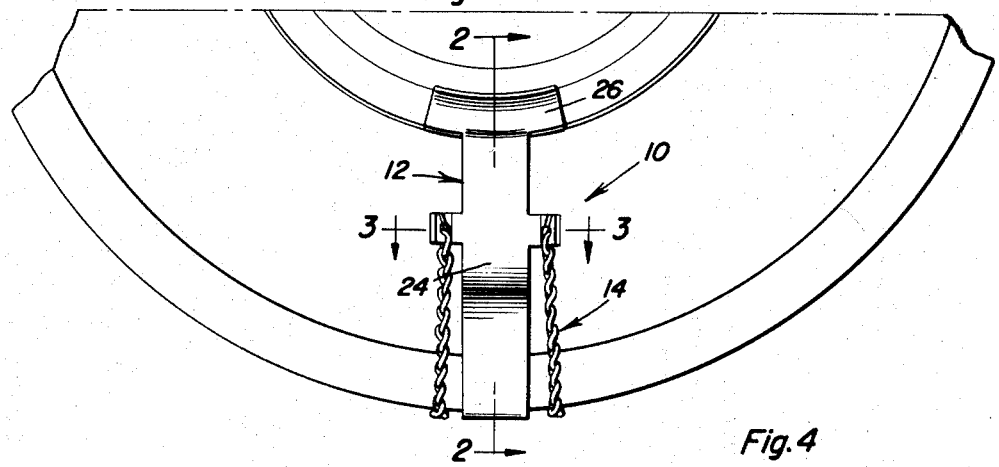
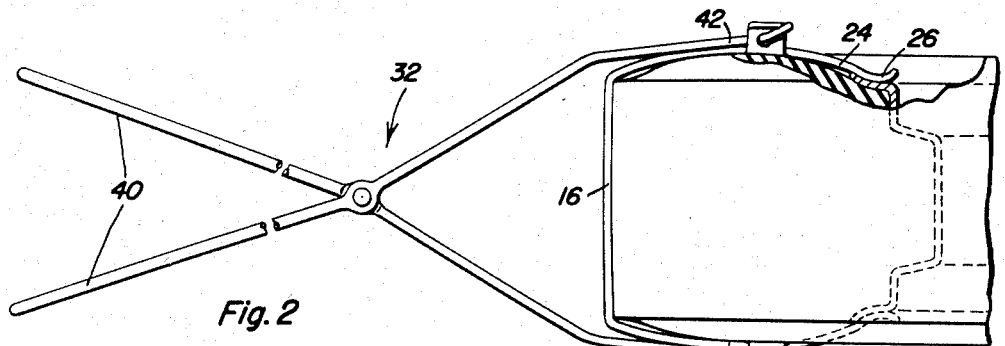
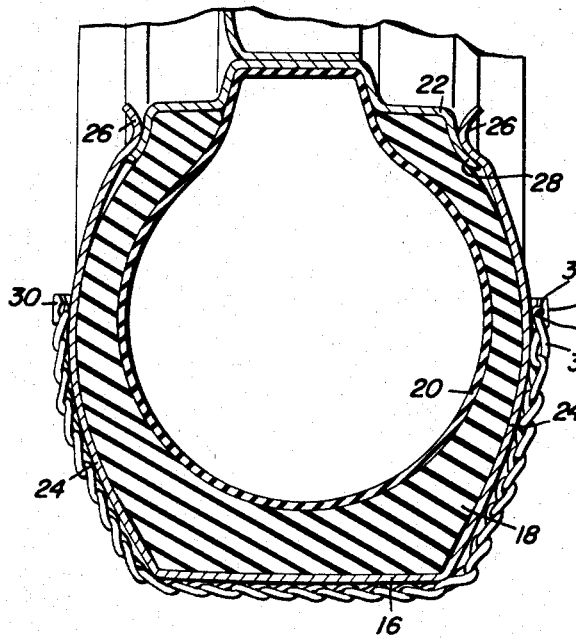
Edward F. Agnew
INVENTOR.
BY *Thomas A. O'Brien*
and *Harvey B. Jackson*
Attorneys

United States Patent Office 2,926,716
Patented Mar. 1, 1960

2,926,716

TRACTION DEVICE

Edward F. Agnew, Metuchen, N.J.

Application January 20, 1958, Serial No. 709,832

5 Claims. (Cl. 152—223)

This invention relates generally to the art of providing traction for vehicles to enable them to travel over slippery surfaces with little or no danger of skidding, and more particularly to a new and novel type of traction device for vehicles.

It is the primary object of this invention to provide a traction device for vehicles which may be simply and readily attached to the tire of a vehicle, and be firmly held thereon, while still providing an excellent traction surface for the tire so that the problem of skidding is practically completely obviated.

Another object of this invention is to provide a device of the character described wherein chains may be applied to a tire, without the necessity for first jacking up the tire as is the case with most of the chains and traction devices now on the market.

Another object of this invention is to provide a plate to which the chains are to be connected, this plate being adapted to fit a great variety of size and shape tires so thtat this device will allow the installation of chains to practically all types of vehicles.

Still a further object of this invention is to provide a device of the character described wherein the plate to which the chains are attached, is made in the form of a clamp, which provide a very firm grip to the rim of a tire, so that in most circumstances a special type of tool is needed to apply this clamp thereon. The clamping surfaces are magnetized, so that the clamp will better adhere to the rim of practically all types of vehicles.

An even further object of this invention is to provide a simple and inexpensive device and yet one which is exceedingly effective for the purpose for which it is designed.

This invention contemplates the use of a plate which is formed so as to have a U-shaped configuration, having clamps at the upper ends of each of the legs, these clamps being magnetized. The clamps would be curved so as to more properly engage the curved peripheral edges of conventional types of tire rims. The plate would be made of high carbon steel so that the bending of the legs away from each other in order to secure it to a tire, is a difficult task, and a special type of applying tool which is in the form of a pliers, is usually needed to secure the device to a tire. Lugs are provided on the upper portion of each of the legs, and they are bent outwardly at obtuse angles to each of the legs. Openings are provided in each of the lugs, which have slots connecting the openings with the upper edges of the lugs, so that the end link of a chain may be engaged thereon and secured about the ground engaging portion of a tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention, illustrating the same as engaged about a tire;

Figure 2 is a vertical sectional view, considerably enlarged, taken substantially along the plane defined by reference line 2—2 of Figure 1;

Figure 3 is a partial horizontal sectional view taken substantially along the plane defined by reference line 3—3 of Figure 1; and Figure 4 is an elevational plan view, with parts broken away for clarity, illustrating the use of the applying tool for engaging the U-shaped plate about the tire.

Referring now more specifically to the drawings, the numeral 10 generally designates the traction device comprising the present invention. This device is constructed of a plate 12 which is bent into a U-shaped configuration, and a plurality of chains 14 which are engaged about the ground engaging surface of a tire and held in place by being connected to plate 12 at either end thereof.

The plate 12 is of a U-shaped configuration, and has a substantially flat bight portion 16 which will lie in contacting relation with the ground engaging surface of a conventional tire 18. This tire 18, may or may not have a tube 20 on the inside thereof, depending on the type of tire. In either case, the tire 18 will be engaged on the rim 22 of a wheel.

Outwardly bowed legs or arms 24 project upwardly from the outer ends of bight portions 16, and have magnetized, curved clamping sections 26 located at the upper end thereof, which are curved so as to suitably conform to and engage the curved peripheral surface 28 of conventional tire rim 22. The U-shaped plate 12, is resilient and therefore may conform to a great variety of shape and size tires. In either case, the clamp 26 does not engage the curved surface 28 of a tire rim, the magnetized clamp 26 will serve to hold the plate 12 to the tire wheel or rim.

Projecting lugs 30 extend outwardly from the legs 24, and are connected near the upper end thereof. As may be seen in Figure 3, these lugs 30 extend outwardly from flat leg 24 at obtuse angles, for the purpose of allowing an applying tool 32 to be used to engage the plate 12 onto a tire, and also to allow room for the links of chain 14. Each of the lugs 30 has openings 34 formed centrally thereof, with slots 36 extending from the upper edge of lugs 30, and intersecting the openings 34 so that upper links 38 of the chains 14 may be engaged with the lugs 30.

In use, the plate 12 will be resilient, however, in order to apply the plate to a tire, it is required that the legs 24 be moved away from each other. The force to so move these legs is or should be very difficult for the average person. Therefore, an applying tool 32 having handles 40 and working ends 42, would be used to apply the plate 12. Each of the applying ends or working ends 42 would be inserted into an opening 34 in each of the lugs 30 to which a chain would be engaged. The tool 32 would be used so that each of the ends 42 would be located on either side of a tire. Then, by moving the handles 40 toward each other the legs 24 would be spread and the plate 12 may be easily applied to the tire. As was previously explained, the plate 12 will be held to the tire wheel or rim by means of the clamps 26, either because of the resiliency of the legs 24, the curved engaging surfaces 26 mating with curved surfaces 28, or the magnetized clamp portion 26 engaging metal and being atttracted thereto. In either case, it may be seen that an extremely efficient and versatile as well as useful traction device for vehicles has been explained.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A traction device for tires of vehicles comprising a generally U-shaped plate constructed of spring metal having a bight portion adapted to contact the ground engaging surface of a tire and curved arms conforming to and adapted to embrace the sides of a tire projecting from each end of said bight portion, said arms being resiliently biased together whereby they effect a gripping action upon the sides of a tire disposed therebetween, an integral supporting lug formed on at least one side of the mid-portion of each of said arms having openings formed centrally therein, a chain end link secured to each of said lugs whereby a chain, of such length so that it will lie upon a radius of a wheel, may be supported by and between said lugs, an integral transversely enlarged horizontal convexed portion on the free end of each of said arms conforming to and adapted to engage the concave portion of a tire rim, said lugs projecting outwardly and to one side of said plate whereby the end links of said chain will be spaced from the tire to facilitate easy removal or replacement of the latter and whereby said chain will lie on a radius of a wheel other than the radius thereof on which said plate lies to maintain said plate and said chain in spaced relation to eliminate loss of traction caused by the plate riding over the chain.

2. The combination of claim 1, wherein said convexed portion is magnetized.

3. The combination of claim 2, wherein said supporting lugs are formed on both sides of said arms thereby affording support for the ends of chains on both sides of said plate.

4. The combination of claim 1, including a slot formed in each lug extending from said opening to the edge of said lug at the top thereof whereby the end links of a chain may be readily removed from said openings during the removal or replacement of said chains on said plate.

5. The combination of claim 4, wherein said supporting lugs are formed on both sides of said arms thereby affording support for the ends of chains on both sides of said plate.

References Cited in the file of this patent

UNITED STATES PATENTS

| | | |
|---|---|---|
| 2,440,863 | Liggio | May 4, 1948 |
| 2,514,243 | Iandiorio | July 4, 1950 |
| 2,630,155 | Kandel | Mar. 3, 1953 |
| 2,643,697 | Shill | June 30, 1953 |
| 2,651,347 | Gardetto | Sept. 8, 1953 |